United States Patent
Hagan

(10) Patent No.: US 6,698,767 B2
(45) Date of Patent: Mar. 2, 2004

(54) ADJUSTABLE SUSPENSION STABILIZER BAR

(75) Inventor: Daniel Lee Hagan, Oakland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 32 days.

(21) Appl. No.: 09/683,999

(22) Filed: Mar. 11, 2002

(65) Prior Publication Data

US 2003/0168820 A1 Sep. 11, 2003

(51) Int. Cl.$^7$ .................. B60G 21/055; B60G 17/01
(52) U.S. Cl. ..................... 280/5.511; 280/124.107
(58) Field of Search ............... 280/5.506, 5.511, 280/124.106, 124.107, 124.149, 124.152, 124.166; 267/188, 273, 277

(56) References Cited

U.S. PATENT DOCUMENTS

| 3,504,930 A | 4/1970 | Kozowyk et al. |
|---|---|---|
| 3,913,939 A | 10/1975 | Sinclair et al. |
| 4,648,620 A | 3/1987 | Nuss |
| 4,962,943 A | 10/1990 | Lin |
| 5,251,926 A | 10/1993 | Aulerich et al. |
| 6,022,030 A | * 2/2000 | Fehring .................. 280/5.511 |
| 6,428,019 B1 | * 8/2002 | Kincad et al. ........... 280/5.511 |
| 6,435,531 B1 | * 8/2002 | Acker et al. .......... 280/124.107 |
| 6,513,819 B1 | * 2/2003 | Oliver et al. ......... 280/124.152 |
| 6,550,788 B2 | * 4/2003 | Schmidt et al. .......... 280/5.511 |

FOREIGN PATENT DOCUMENTS

EP 428439 A1 * 5/1991 .......... B60G/21/02

* cited by examiner

Primary Examiner—David R. Dunn
(74) Attorney, Agent, or Firm—Gregory D. Brown

(57) ABSTRACT

An adjustable stabilizer bar (10) for a vehicle comprises a primary torsional reaction segment (12). The primary reaction segment includes an outer tube (36) selectively engaged through a splined cog (58) to a torsional bar (42). The cog (58) can be positioned to provide zero torsional stiffness by decoupling the outer tube (36) from the torsional bar (42) and it can be positioned to vary the torsional stiffness between minimum and maximum torsional stiffness positions wherein the cog engages the outer tube (36) to the torsional bar (42).

9 Claims, 2 Drawing Sheets

ADJUSTABLE SUSPENSION STABILIZER BAR

BACKGROUND OF INVENTION

1. Field of the Invention

The present invention generally relates to stabilizer bars found in motor vehicles, and more particularly, to an adjustable stabilizer bar capable of being rapidly adjusted while installed in the motor vehicle.

2. Background of the Invention

It is generally known by automotive designers that torsional stabilizer bars have proven useful in vehicles for many years. Such stabilizer bars commonly employ a transverse torsion bar segment pivotally attached to the vehicle chassis and leading or trailing longitudinal segments attached to a control arm or wheel carrier. These stabilizer bars act in a manner such that when a pair of left and right wheels undergo differential motion in both jounce and rebound travel relative to the vehicle body, tilting of the vehicle body will be resisted by the torsional resistance produced in the stabilizer bar.

For a variety of reasons, automotive designers vary the diameters of conventional stabilizer bars. This diameter change varies the stabilizer bar stiffness, when the diameter is increased it also degrades ride quality in many vehicles. This results because the stabilizer couples the wheels together. For example, when one wheel strikes a raised obstruction in the roadway during straight running, the body will tend to absorb more energy when a stronger or stiffer stabilizer is used than when a bar of lesser torsional stiffness is fitted.

Designers have sought to enhance the function of stabilizer bars in a variety of ways. U.S. Pat. No. 4,648,620 discloses an adjustable stabilizer bar having a base stabilizer bar that can be selectively modified to a higher level of stiffness through a secondary torsional reaction segment engaged by means of a clutch mechanism. This stabilizer cannot produce varied degrees of torsional stiffness, including a zero stiffness condition. U.S. Pat. No. 4,962,943 discloses an automatically adjusting stabilizer bar that relies on a costly and complex control system to hydraulically actuate a pair of cogs disposed between a base stabilizer bar and a torsional outer tube to vary the torsional stiffness of the stabilizer bar. This system is overly complex and does not readily achieve a wide range of torsional stiffness adjustment.

Accordingly, there exists a need, heretofore unfulfilled, for an adjustable stabilizer bar that does not require a costly hydraulic system for adjustment and is capable of being adjusted over a wide range of torsional stiffness, including zero torsional stiffness. This allows for enhanced off road performance in one adjusted position while allowing an operator to tune the stabilizer torsional stiffness for preferred ride quality or handling characteristics during on road vehicle operation.

SUMMARY OF INVENTION

In accordance with the teachings of the present invention, an adjustable stabilizer bar for a vehicle having a suspension with multiple roadwheels comprises a primary torsional reaction segment having first and second ends and a first end link interconnecting the first end of the primary torsional reaction segment with the suspension. A second end link is provided for interconnecting the second end of the primary torsional reaction segment with the suspension. The second end link is laterally spaced from the first end link when installed in the vehicle such that the primary torsional reaction segment will be torsionally loaded during jounce and rebound motion of the road wheels.

The primary torsional reaction segment includes an outer tube attached to the first end of the primary torsional reaction segment. The outer tube includes a splined inner surface. The primary torsional reaction segment also includes a torsion bar attached to the second end of the primary torsional reaction segment. The torsion bar includes a splined outer surface. An annular region is created between the torsion bar and the outer tube upon assembly. The primary torsional reaction segment also includes a cog disposed in this annular region and it includes inner mating splines for engagement with the splined outer surface of the torsion bar and outer mating splines for engagement with the splined inner surface of the outer tube.

The primary torsional reaction segment includes an actuator operatively engaged with the cog and capable of sliding the cog to a desired position within the annular region such that the cog can be made to transfer all torsional loading between the outer tube and the torsion bar.

These and other features, advantages and objects of the present invention will be further understood and appreciated by those skilled in the art by reference to the following specification, claims and appended drawings.

DETAILED DESCRIPTION

Figure 1:
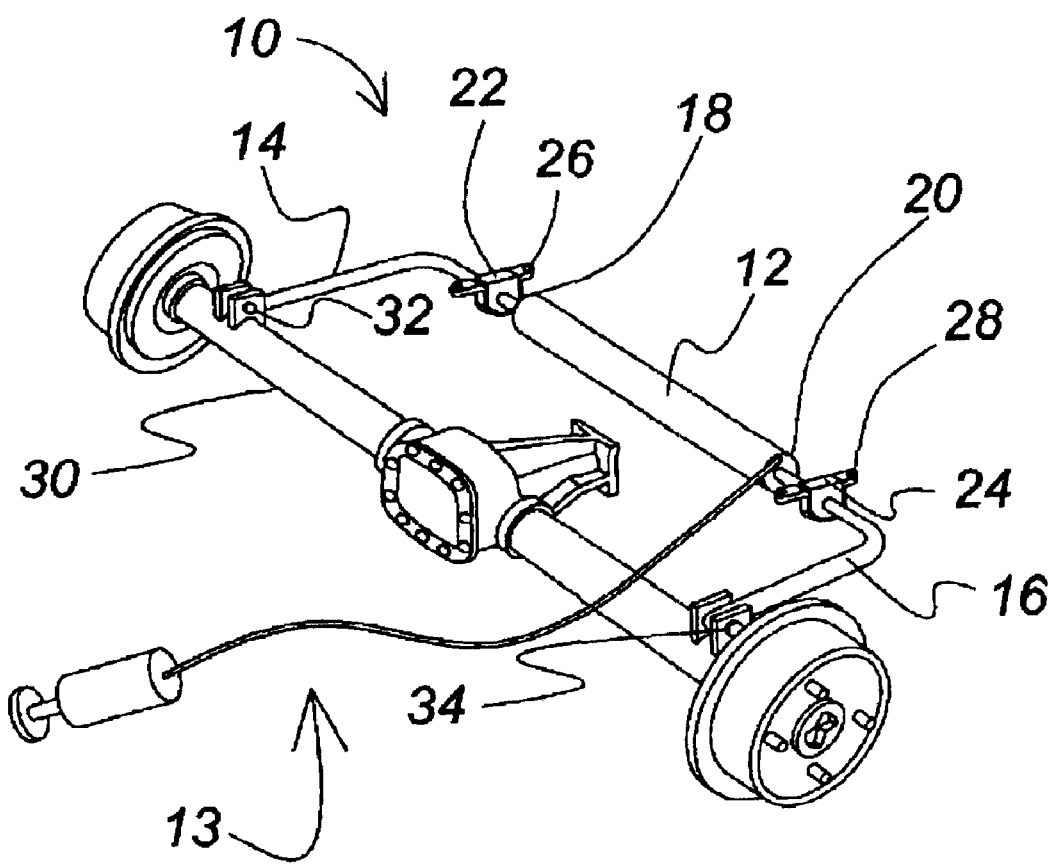
FIG. 1 is a perspective view of an adjustable stabilizer bar according to the present invention showing the adjustable stabilizer bar attached to a vehicle axle.

Referring to FIG. 1, an adjustable stabilizer bar 10 includes a primary torsional reaction segment 12 and laterally spaced apart first and second end links 14, 16 extending from first and second ends 18, 20 of the primary torsional reaction segment, respectively. The adjustable stabilizer bar 10 pivotally attaches to the chassis by isolating mounts 22 and 24 and brackets 26 and 28. The primary torsional reaction segment 12 and the first and second end links 14, 16 may have a circular or polygonal cross section or any other cross section known to those skilled in the art. When used herein, the term "chassis" means conventional automotive chassis as well as conventional unitized automotive body structures.

The first and second end links 14, 16 provide attachment of the adjustable stabilizer bar 10 to a suspension, such as an axle assembly 30. Longitudinal portions of first and second end links 14, 16 are pivotally connected to the axle assembly 30 at pivots 32 and 34. Those skilled in the art will appreciate that the longitudinal portions of the first and second end links 14, 16 need not be unitary and could, for example, comprise linkages of various types known to those skilled in the art.

Although the suspension shown in FIG. 1 is that of a conventional beam-type rear axle of a rear drive automobile, the adjustable stabilizer bar of the present invention can be used with a front or rear suspension having either independent or beam-type construction. Further, the adjustable stabilizer bar of the present invention is suitable for use with either leading or trailing road wheels to which it is connected. In any event, the adjustable stabilizer bar will incorporate linkages for communicating torsional reactions from the primary torsional reaction segment 12 to a part of a road wheel suspension subject to displacement during jounce and/or rebound movement of the vehicle's road wheels.

Figure 2:
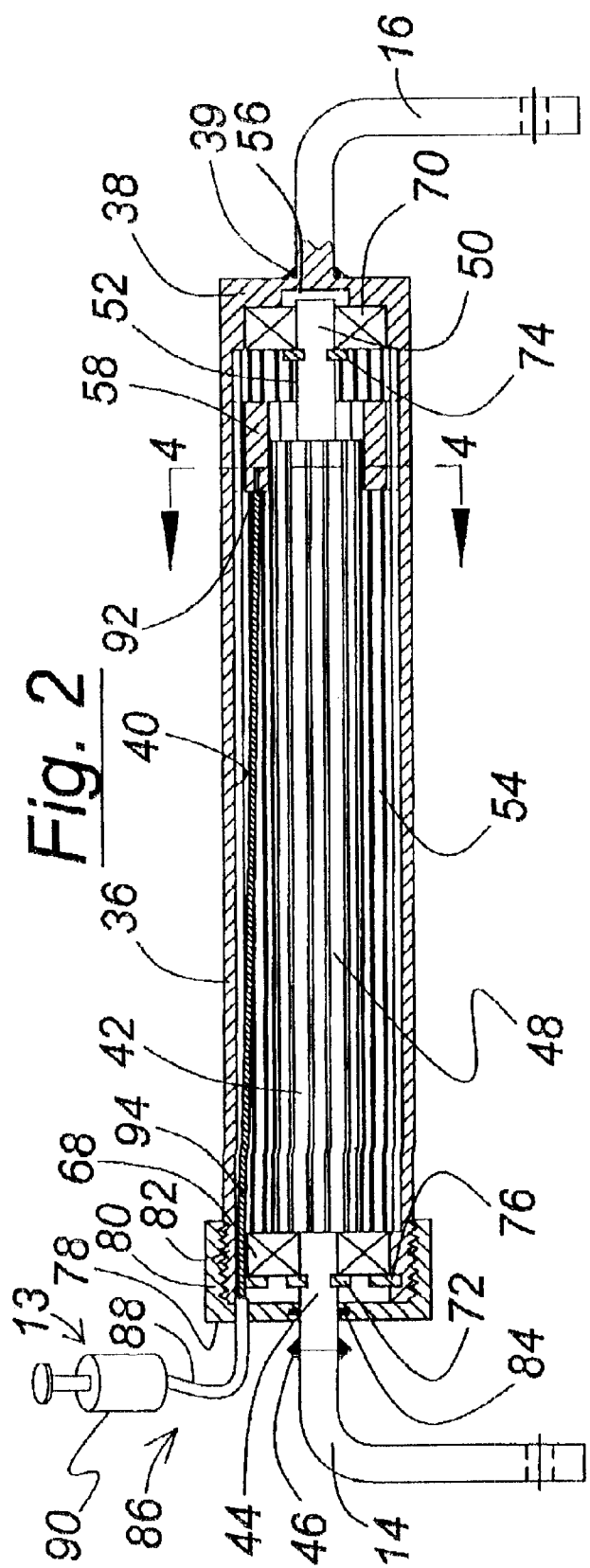
FIG. 2 is a partially sectioned top view of a primary torsional reaction segment in accordance with the present invention.
Figure 4:
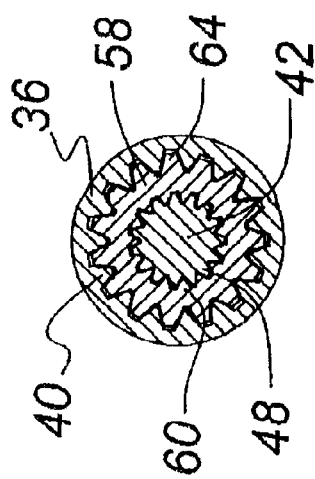
FIG. 4 is a sectional view taken along line 4—4 of FIG. 2, illustrating a cog engaged with an outer tube and a torsion bar in accordance with the present invention.

Referring now to FIGS. 1, 2 and 4, the primary torsional reaction segment 12 is capable of selectively varying the torque reactive capacity of the adjustable stabilizer bar. As illustrated, an actuator 13 can adjust the adjustable stabilizer bar from zero torsional stiffness (also referred to as a "no-bar" condition) up to a maximum torsional stiffness condition. The primary torsional reaction segment 12 includes an outer tube 36 having a closed end 38 attached by weldment 39 or otherwise to the second end link 16. The outer tube 36 includes a splined inner surface 40.

The primary torsional reaction segment 12 also includes a torsion bar 42 coaxial with as well as coextensive with the outer tube 36 and having a fixed end 44 attached by weldment 46 or otherwise to the first end link 14. The torsion bar 42 also includes a splined outer surface 48 extending from the fixed end 44 towards a free end 50. The torsion bar 42 also includes an unsplined portion 52 of its outer surface, adjacent to the free end 50. An annular region 54 extends from the fixed end 44 to the free end 50 and includes a no-bar portion 56 that is coextensive with the unsplined portion 52 of the torsion bar 42 and adjacent to the second end 20 of the primary torsional reaction segment 12.

Figure 3:
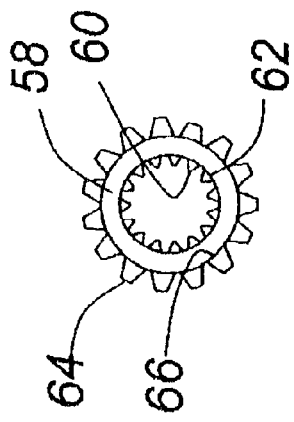
FIG. 3 is an end view of a cog from the primary torsional reaction segment in accordance with the present invention.

Referring now to FIGS. 3 and 4, a cog 58 is slidably disposed within the annular region 54 and includes inner mating splines 60 on its inner circumference 62 and outer mating splines 64 on its outer circumference 66. The inner mating splines 60 are matched for mating engagement to the splined outer surface 48 on the torsion bar 42 and the outer mating splines 64 are matched for mating engagement to the splined inner surface 40 of the outer tube 36.

Referring back now to FIG. 2, first and second bearing members 68, 70 are retained at the fixed and free ends 44, 50 of the torsion bar 42 by c-clips 72, 74. Another c-clip 76 may be used to positively retain the torsion bar 42 and cog 58 within the outer tube 36. In this manner, all radial and axial play between the outer tube 36 and the torsion bar 42 is eliminated by the bearings and c-clips. Due to the bearings, in the absence of cog 58, torsion bar 42 would be free to rotate relative to the outer tube 36. A dust cap 78 includes a threaded flange 80 for attachment to an open end 82 of the outer tube 36 and a sealed aperture 84 for a sealed fit to the fixed end 44 of the torsion bar 42.

Those skilled in the art will appreciate that the outer tube 36, torsion bar 42 and the cog 58 may be constructed of any suitable material such as various ferrous or non-ferrous metals, or non-metallic materials such as fiber reinforced plastic composites.

The actuator 13 may include a push-pull style cable mechanism 86 having a cable sheath 88, a control end 90 and a cog end 92 and a sliding cable 94 extending from the control end 90 through the cable sheath 88 to the cog end 92. The control end 90 allows an operator within the vehicle to push or pull a prescribed amount of cable 94 through the cable sheath 88, thereby causing the cog 58 to slide to a desired position within the annular region corresponding to a desired torsional stiffness of the primary torsional reaction segment 12. Those skilled in the art will recognize that the cog 58 may be automatically driven by any one of several well known controllable mechanisms, such as a linear servomotor that could be controlled by an advanced chassis control system taking various vehicle dynamics parameters such as velocity, roll, pitch and yaw and others into consideration.

In operation, the cable mechanism 86 positions the cog 58 in a desired location within the annular region 54 of the primary torsional reaction segment 12. In the presently preferred embodiment, with the cog 58 positioned adjacent to the unsplined portion 52 of the torsion bar 42, the primary torsional reaction segment produces zero torsional resistance, as the outer tube 36 is free to rotate about the torsion bar 42 on the first and second bearing members 68, 70. As the cable mechanism 86 draws the cog 58 into initial engagement with torsion bar 42 adjacent to the unsplined portion 52, the primary torsional reaction segment 12 produces its minimum level of torsional resistance. This torsional resistance can then be increased up to a maximum level of torsional resistance by drawing the cog 58 adjacent to the first bearing member 68. Note that when the primary torsional reaction segment 12 is producing resistance between the minimum and maximum torsional resistance level, all torsional loading is transferred through the cog 58.

This system of manual control thus allows the vehicle operator to choose the degree of torsional resistance desired on the basis of road conditions or to suit his taste regarding the suspension stiffness desired for his vehicle. For example, in popular SUV vehicles, it is very desirable to select a zero torsional resistance position for off road operation in addition to being able to select the amount of torsional resistance for on road operation.

It will be understood by those who practice the invention and those skilled in the art, that various modifications and improvements may be made to the invention without departing from the spirit of the disclosed embodiment. The scope of protection afforded is to be determined by the claims and by the breadth of interpretation allowed by law.

What is claimed is:

1. An adjustable stabilizer bar for a vehicle having a suspension with multiple roadwheels, said adjustable stabilizer bar comprising:

a primary torsional reaction segment having first and second ends;

a first end link interconnecting said first end of said primary torsional reaction segment with said suspension;

a second end link interconnecting said second end of said primary torsional reaction segment with said suspension, said second end link being laterally spaced from said first end link when installed in said vehicle such that said primary torsional reaction segment will be torsionally loaded during jounce and rebound motion of said roadwheels;

wherein said primary torsional reaction segment further comprises:

an outer tube extending from said second end of said primary torsional reaction segment and having a splined inner surface;

a torsion bar extending from said first end of said primary torsional reaction segment and having a splined outer surface;

an annular region between said torsion bar and said outer tube;

a cog disposed in said annular region and having inner mating splines for engagement with said splined outer surface of said torsion bar and outer mating splines for engagement with said splined inner surface of said outer tube; and an actuator operatively engaged with said cog and capable of sliding said cog to a desired position within said annular region.

2. The apparatus as defined in claim 1, wherein said annular region includes a no-bar portion adjacent to said second end of said primary torsional reaction segment.

3. The apparatus as defined in claim 1, wherein said torsion bar includes an unsplined portion to allow said cog to rotate freely thereon.

4. The apparatus as defined in claim 1, wherein said actuator comprises a cable disposed within a cable sheath and having a cog end attached to said cog and a control end for receiving inputs to control said cog.

5. The apparatus as defined in claim 1, further comprising:

a first bearing member disposed in said annular region adjacent to said first end of said primary torsional reaction segment; and a second bearing member disposed in said annular region adjacent to said second end of said primary torsional reaction segment, said first and second members being operative to allow relative rotation between said outer tube and said torsion bar.

6. The apparatus as defined in claim 1, wherein said torsion bar is spaced and separated from said second end link.

7. An adjustable stabilizer bar for a vehicle having a suspension with multiple roadwheels, said adjustable stabilizer bar comprising:

a primary torsional reaction segment having first and second ends;

a first end link interconnecting said first end of said primary torsional reaction segment with said suspension;

a second end link interconnecting said second end of said primary torsional reaction segment with said suspension, said second end link being laterally spaced from said first end link when installed in said vehicle such that said primary torsional reaction segment will be torsionally loaded during jounce and rebound motion of said roadwheels;

wherein said primary torsional reaction segment further comprises:

an outer tube extending from said second end of said primary torsional reaction segment and having a splined inner surface;

a torsion bar extending from said first end of said primary torsional reaction segment and having a splined outer surface;

an annular region between said torsion bar and said outer tube and having a no-bar portion adjacent to said second end of said primary torsional reaction segment;

a cog disposed in said annular region and having inner mating splines for engagement with said splined outer surface of said torsion bar and outer mating splines for engagement with said splined inner surface of said outer tube;

a cable disposed within a cable sheath and having a cog end attached to said cog and a control end for receiving inputs to control said cog said cable being operative of slide said cog to a desired position within said annular region; and whereby said cog transfers any torsional loading between said outer tube and said torsion bar.

8. The apparatus as defined in claim 7, wherein said torsion bar includes an unsplined portion to allow said cog to rotate freely thereon.

9. The apparatus as defined in claim 7, further comprising:

a first bearing member disposed in said annular region adjacent to said first end of said primary torsional reaction segment; and a second bearing member disposed in said annular region adjacent to said second end of said primary torsional reaction segment, said first and second members being operative to allow relative rotation between said outer tube and said torsion bar.

* * * * *